United States Patent Office 3,313,216
Patented Apr. 11, 1967

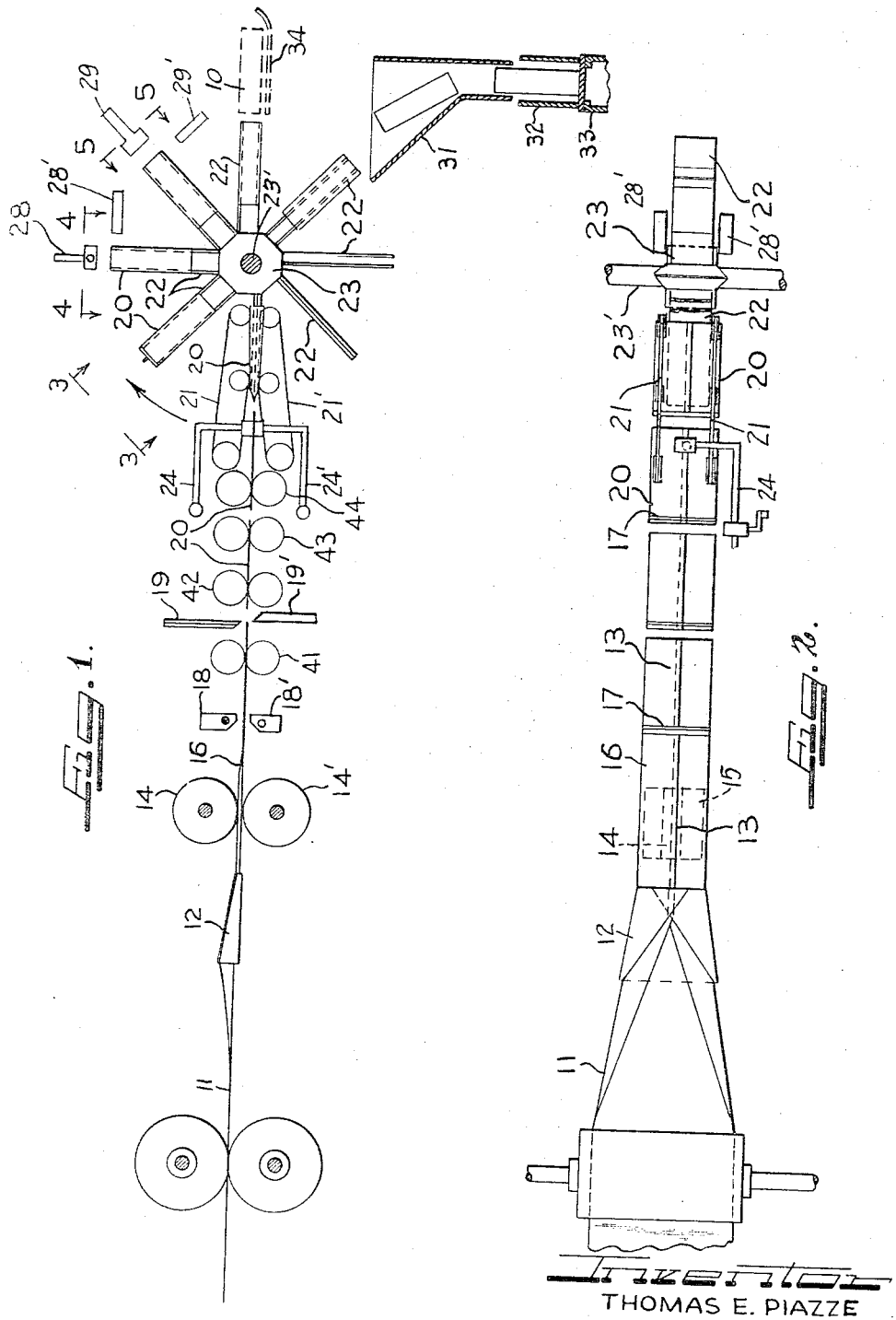

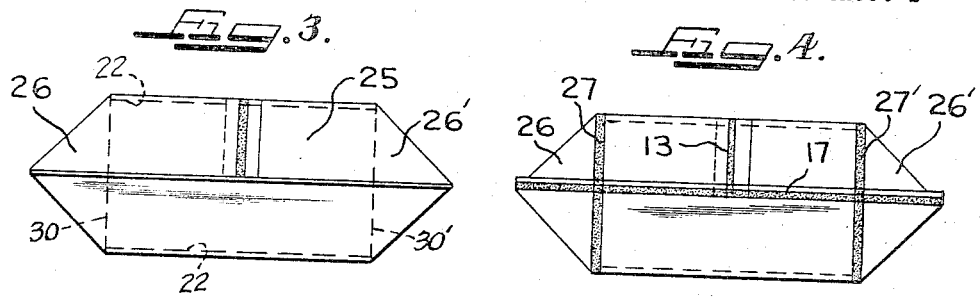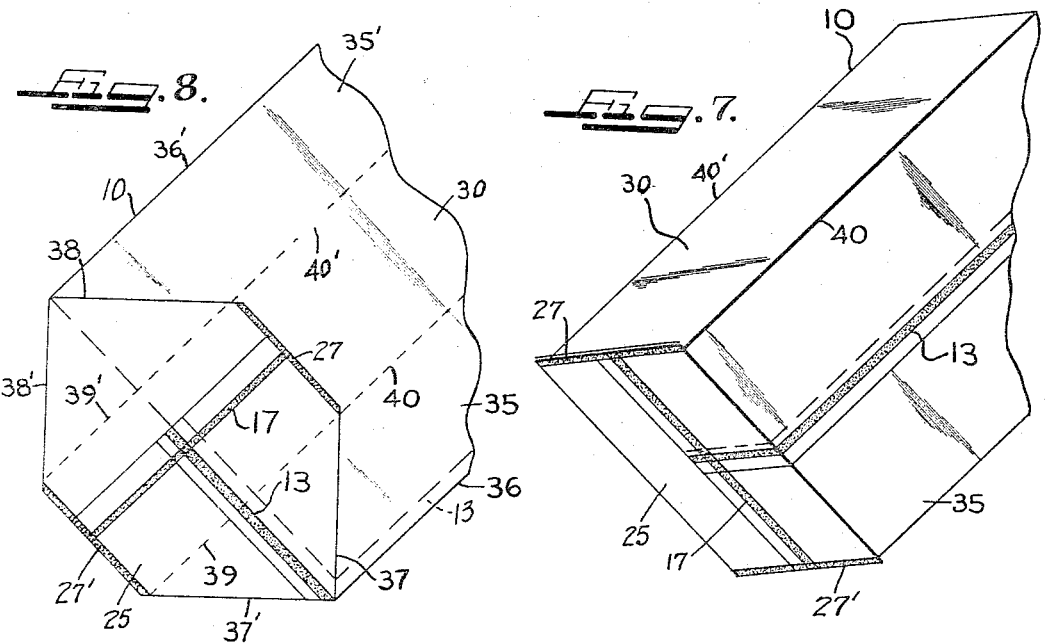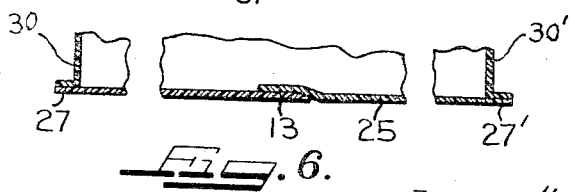

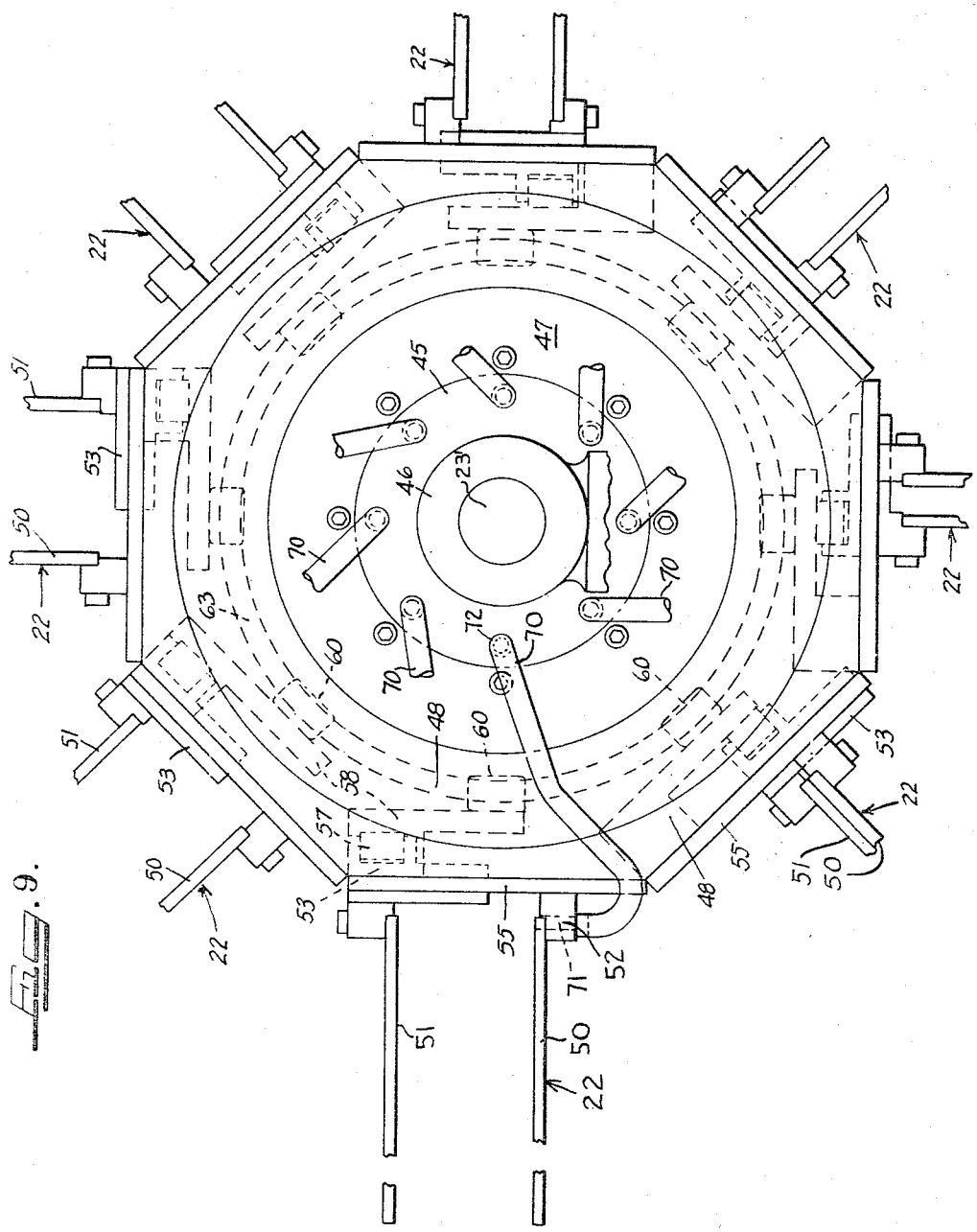

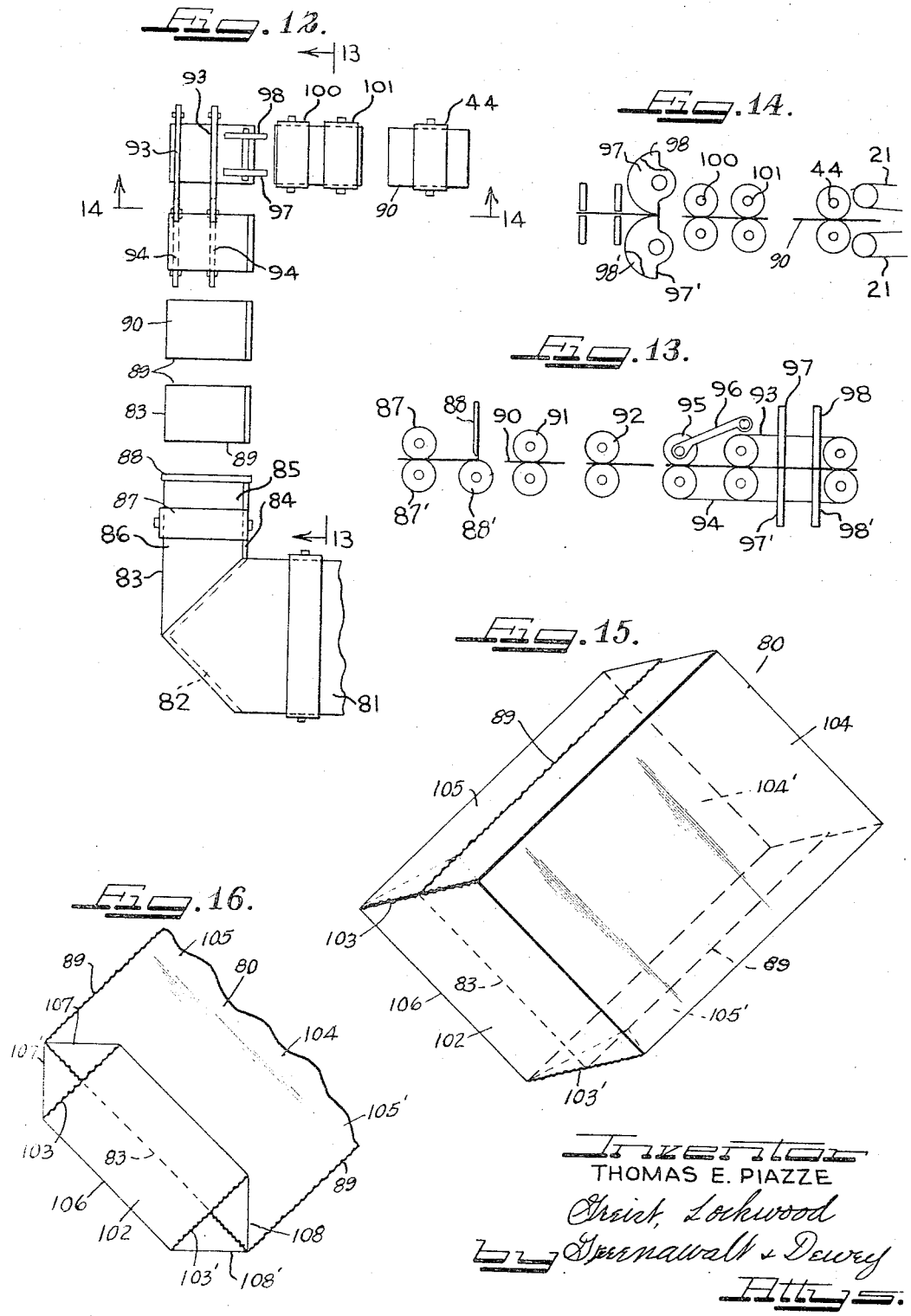

3,313,216
BAG MAKING APPARATUS
Thomas E. Piazze, Mount Vernon, Ohio, assignor to Continental Can Company, Inc., New York, N.Y., a corporation of New York
Original application Jan. 11, 1962, Ser. No. 165,689, now Patent No. 3,150,573, dated Sept. 29, 1964. Divided and this application June 29, 1964, Ser. No. 378,808
5 Claims. (Cl. 93—8)

This invention relates to receptacles and is more particularly concerned with improvements in bags which are formed from flexible plastic sheet materials and methods and apparatus for fabricating the same.

This application is a division of application Ser. No. 165,689, filed Jan. 11, 1962, now Patent No. 3,150,573.

It is a general object of the invention to provide an improved bag structure and a method and apparatus for forming the same wherein a flexible plastic sheet material is folded, sealed and cut so as to provide, when separataed, a plurality of tubular bag forming sections with each section open at one end and closed at the other end by the folding or sealing operations so as to provide a square bottom formation.

It is a more specific object of the invention to provide a bag structure and a method and apparatus for forming the same wherein a sheet of flexible bag making material is initially folded into flattened tube forming relation and the tube is divided into bag forming sections each with one end closed, each bag forming section is opened up on a mandrel and the closed end is reformed so as to provide the bag with a square bottom construction.

It is another object of the invention to provide a bag structure and a method and apparatus for forming the same wherein a length of flattened tubular material is transversely sealed at one end and then opened up on a mandrel so as to permit additional seals to be made in the bottom forming material whereby to provide the bag with a square bottom construction.

It is still another object of the invention to provide a method and apparatus for fabricating bags by forming flexible sheet material into tube-like sections with one end of each section flattened and closed by a transverse seam or fold, opening up each tubular section so as to provide a body portion having a rectangular cross section and a bottom forming portion at the closed end of the tubular section having triangular end portions extending outwardly of oppositely disposed side walls, forming seals across the triangular portions at the bottom forming edges of the side walls so as to provide a square bottom, and removing the end portions which are outside of the sealed areas.

It is a further object of the invention to provide a method of fabricating a bag which comprises transversely sealing one end of a section of flexible tubular material, opening up the tubular section so as to provide a body portion having a rectangular cross section, folding bottom forming portions at the sealed end of the tubular section into a transverse plane resulting in triangular end portions extending in the plane of the bottom and outwardly of oppositely disposed side walls, sealing across the inside edges of the triangular portions so as to provide a square bottom, and removing the triangular portions which are outside of the sealed edges.

It is another object of the invention to provide a bag construction wherein a section of tubular material is formed which is closed across one end thereof, the tubular section is telescoped over an expansible mandrel, the mandrel is expanded and the tubular section is opened up so as to provide a body forming portion having a rectangular cross section and bottom forming portions at the closed end which are folded into a transverse plane at the end of the mandrel resulting in triangular folded portions extending in the plane of the bottom and laterally of oppositely disposed side faces of the mandrel, the triangular portions are sealed along the end edges of the mandrel side faces and the parts thereof which extend outside of the sealing lines are cut off thereby forming a square bottom.

It is a still further object of the invention to provide a bag construction wherein a length of tubular material is sealed transversely at one end thereof, the sealed tube is telescoped over an expansible mandrel, the mandrel is expanded and the body forming portion of the tube is opened up so as to provide a rectangular cross section and bottom forming portions adjacent the transverse seal are folded into a transverse plane at the end of the mandrel resulting in triangular folded portions extending in the plane of the bottom and laterally of oppositely disposed side faces of the mandrel, the triangular portions are sealed along the bottom forming end edges of the side faces of the mandrel and finally the triangular portions which extend outside of the sealing lines are cut off thereby forming a square bottom.

Another object of the invention is to provide an apparatus for forming bags from flexible heat sealable plastic film material which comprises mechanism for longitudinally folding a continuous web of the material into flattened tube formation, mechanism for heat sealing the tube to provide spaced seams therein, mechanism for cutting the seamed tube into bag forming sections with one end of each bag section closed, mechanism for delivering the bag sections to expansible mandrels mounted on a rotating frame, mechanism for expanding the mandrels and squaring up each bag section to form a body portion of rectangular cross section and a square bottom with projecting triangular shaped fold portions at opposite sides thereof, mechanism for heat sealing across the triangular fold portions along the edges of the bottom and cutting away the portions thereof projecting outside of the edge seals thus formed and mechanism for delivering the completed bags from the mandrels to an automatic bag filling and closing machine or other processing mechanism.

A further object of the invention is to provide an apparatus for forming bags from flexible heat sealable plastic film material which comprises mechanism for longitudinally folding a continuous web of the material into a continuous flattened tube, mechanism for heat sealing overlapping side edge margins to provide a longitudinal seam, mechanism for transversely sealing the tube at spaced intervals, mechanism for cutting the tube into bag forming sections each with one end sealed along a transverse line, mechanism for delivering the bag sections successively to expansible mandrels mounted on a rotating turret, mechanism associated with the turret for expanding the mandrels and squaring up each bag section to form a body portion of rectangular cross section and a square bottom with projecting triangular shaped fold portions at opposite sides thereof, mechanism also associated with the turret for heat sealing across the triangular fold portions along the edges of the bottom and cutting away the portions thereof projecting outside of the edge seals thus formed, and mechanism for delivering the completed bags in opened up condition from the mandrels.

These and other objects and advantages of the invention will be apparent from a consideration of the several forms of the bag and the method and apparatus for forming the same which are shown by way of illustration in the accompanying drawings wherein:

FIGURE 1 is an elevational view illustrating schematically an apparatus for forming a bag which incorporates therein the principal features of the invention;

FIGURE 2 is a plan view of the bag forming apparatus of FIGURE 1, the view being largely schematic and with portions omitted or broken away;

FIGURE 3 is a view taken on the line indicated at 3—3 in FIGURE 1, to an enlarged scale, showing the bottom end of a bag section on an expanded forming mandrel;

FIGURE 4 is a view taken on the line indicated at 4—4 of FIGURE 1, to an enlarged scale, showing the bottom end of a bag section after it has been flattened against the end of the forming mandrel and sealed;

FIGURE 5 is a view taken on the line indicated at 5—5 of FIGURE 1, to an enlarged scale, showing the final cutting operation which completes the forming of the bag bottom;

FIGURE 6 is a fragmentary section taken on the line 6—6 of FIGURE 5 to a still larger scale;

FIGURE 7 is a perspective view with portions broken away illustrating the completed bag in opened up condition;

FIGURE 8 is a perspective view, with portions broken away, illustrating the completed bag in a flattened condition;

FIGURE 9 is a side elevation, with portions broken away, of the mandrel supporting turret shown in FIGURE 1, the view being to a larger scale;

FIGURE 12 is a plan view illustrating schematically apparatus for forming a modified form of the bag;

FIGURE 13 is a side elevation of the apparatus of FIGURE 12, the view being taken on the line indicated at 13—13 in FIGURE 12;

FIGURE 14 is a side elevation of the apparatus of FIGURE 12, the view being taken on the line indicated at 14—14 in FIGURE 12;

FIGURE 15 is a perspective view of the modified bag structure in opened up condition; and FIGURE 16 is a perspective view of the bottom portion of the modified form of the bag in collapsed and flattened condition, with the view being to a somewhat smaller scale.

Figure 10:
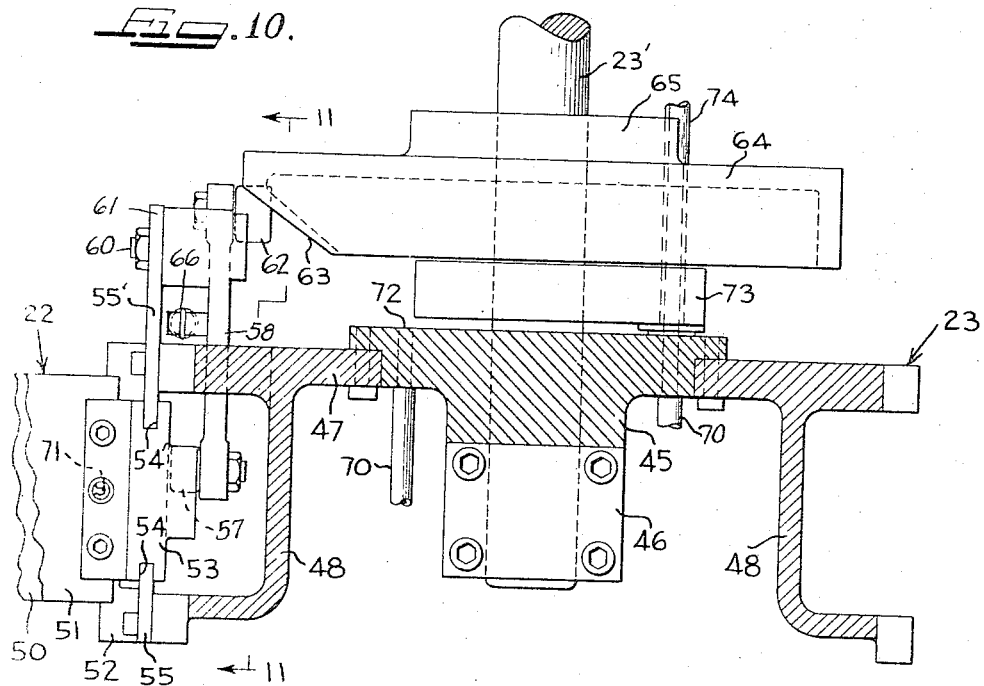
FIGURE 10 is a plan view of the mandrel supporting turret of FIGURE 9; with portions broken away and other portions omitted.

The construction of the bag 10, which is illustrated in its completed and opened up condition in FIGURE 7, will be best understood by reference to the method and apparatus employed in fabricating the same, the apparatus being shown schematically in FIGURES 1 and 2. The bag is formed from a web 11 of a suitable bag forming material such as a relatively thin film of polyethylene plastic. A continuous plastic web 11, delivered from a supply roll or other source, is formed into a tube by a folding horn of conventional construction, as indicated at 12, and a longitudinal seam 13 is formed in the tube by joining overlapped marginal edge portions of the film. This may be accomplished by a heat sealing roller 14 operating against an internal sealing plate 15 and a backing roller 14'. The flattened tube 16 which is thus formed is provided with longitudinally spaced transverse seals 17 by intermittently operating reciprocating sealing irons 18 and 18'. The flattened and sealed tube 16 is advanced to cutting bar or shear members 19 and 19' which sever the tube adjacent the transverse seals 17 and divide the same into successive bag forming sections or lengths 20 of equal size.

Each successive bag forming length or section 20 is then advanced between laterally spaced pairs of co-operating feed belts 21 and 21' and telescoped onto one of a plurality of collapsed mandrels 22 which are carried in peripherally spaced relation on a wheel or turret 23, the latter being rotatably supported on a shaft 23'. The leading end or mouth of each bag section 20 is opened up so that it will telescope over the collapsed mandrel 22 by a pair of pivotally mounted suction arms 24 and 24' which are operated to grip the walls of the bag section adjacent the leading end and move apart a predetermined distance sufficient to receive the mandrel and which may also advance with the bag section to help feed the same onto the mandrel. Each mandrel 22 comprises a pair of rectangular plates which are moved apart or expanded after receiving the bag section by a suitable mechanism as the turret 23 revolves so as to open up the bag section.

The opening up of the bag section 20 forms the body thereof into a rectangular cross section or shape with the bottom forming portion 25 (FIGURE 3) automatically folding flat against the outside end of the mandrel so as to lie in a plane extending transversely of the long axis of the mandrel with folded triangular shaped end sections 26 and 26' extending outwardly of the sides of the mandrel. Transverse seals 27 and 27' (FIGURE 4) are formed across the folded sections 26 and 26' by reciprocating sealing irons indicated at 28 and co-operating reciprocatign platen members 28' (FIGURE 1). The waste portions of the triangular sections 26 and 26' are then trimmed or cut off and discarded at the next station, as indicated in FIGURE 5, by reciprocating trimming knives 29 and co-operating reciprocating platen members 29', leaving the bottom forming portions 25 of the bag in the form of a rectangle or a square bottom formation with the seal or seam formations 27 and 27' defining the bottom edges of the oppositely disposed side walls 30 and 30' which result from squaring up the body of the bag on the mandrel 22. The edge seals 27 and 27' project a slight distance outwardly of the bottom edges of the side walls 30 and 30' as shown in FIGURES 6 and 7.

The bag 10 in its squared condition as shown in FIGURE 1 is ejected from the turret 23 by collapsing the mandrel 22 and axially moving the bag outwardly in a radial direction away from the same. The finished bag may be blown off the mandrel or any other suitable stripping device may be employed to remove the same. It may then be used for packaging merchandise in its final squared up and open condition, the bag being filled with the merchandise and an appropriate top seal provided to close the open mouth thereof. The apparatus may be employed with a bag filling and closing machine and provision made, as shown in FIGURE 1, for discharging the bags into a hopper indicated at 31, which guides the bags for deposit by gravity or through suction into a pocket 32 of a traveling conveyor 33 in which the bags are filled and closed by appropriate mechanisms.

Alternatively, the bags 10 may be stripped from the mandrels 22 for horizontal delivery to a platform 34 as indicated in dotted line in FIGURE 1. The bags may be forwarded from the platform 34 to a filling and closing machine or to any other apparatus for performing further operations on the same.

If it is desired to store the bags for a period of time after they are removed from the mandrels 22, or if it is desired to accumulate a quantity of the bags in a stack, each bag may be collapsed and the bottom flattened as illustrated in FIGURE 8. This is most readily accomplished by simultaneously flattening the body of the bag and the bottom forming portion 25, the side walls 30, 30' and 35, 35' being flatened or collapsed so as to bring the longitudinal seam 13 along a center fold line in the side wall 35 which becomes the one edge 36 of the flattened body. The bottom forming portion 25 is folded into the plane of the one side wall 34 with the seam 17 extending in the direction of the long axis of the body of the bag and with the lower portions of the side walls 35 and 35' folding into the plane of the bottom portion 25 along fold lines 37, 37' and 38, 38' which extend from the ends of the seams 27, 27' to the ends of the edge folds 36 and 36'. The initially formed bottom side edge creases or folds 39 and 39' and the initial corner edge creases or folds 40 and 40' are indicated in dotted line in FIGURE 8.

The apparatus shown in FIGURES 1 and 2 is provided with co-operating feed rolls 41, 42, 43 and 44 or equivalent feed devices for advancing the web and the tube sections to successive work stations and these feed devices, together with the forming, sealing and cutting devices will be mounted on a suitable supporting frame and will be operated by appropriate drive mechanisms (not shown) connected thereto.

Figure 11:
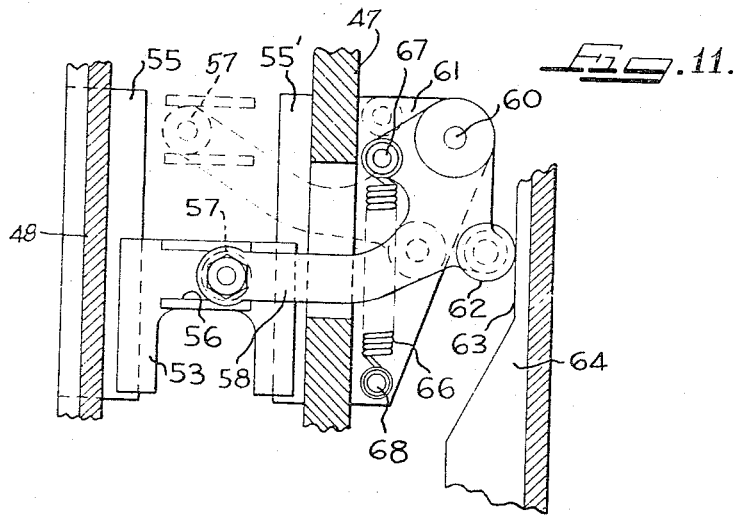
FIGURE 11 is a cross section taken on the line 11—11 of FIGURE 10.

The turret mechanism 23 with associated apparatus for operating the mandrels 22 is preferably constructed as shown in detail in FIGURES 9 to 11 of the drawings. It comprises a hub 45 mounted on the power shaft 23' which has its end supported in the bearing 46. The hub 45 carries a ring member 47 which has eight bracket formations 48 spaced about its periphery for mounting thereon the bag expanding mandrels 22. Each of the mandrels 22 comprises a pair of relatively movable rectangular plate members 50 to 51. The one plate member 50 is mounted in fixed relation on a cross bar forming portion 52 of a bracket formation 48. The other plate member 51 is secured on a carriage or slide member 53 which has guide slots 54 and 54' in its side edges for mounting the same in sliding relation on a pair of inwardly facing guide rails 55 and 55', the latter being provided on the bracket formation 48. Movement of the slide 53 separate the plates 50 and 51 while holding them in parallel relation. The slide 53 is formed with a cam track or groove 56 on its inside face which extends at right angles to the direction of movement of the slide and which receives a cam roller 57. The cam roller 57 is carried on the free end of a generally L-shaped rocker arm or lever 58. The other end of the cam arm 58 is attached by pivot 60 to a bracket forming extension 61 on the guide rail forming member 55'. The cam arm 58 carries another cam roller 62 adjacent the pivot 60 which engages the cam track 63 of a face cam 64. The cam 64 is mounted in fixed position on a stationary frame 65 on which the shaft 23' is supported. The cam track 63 is shaped so as to operate the arm 58 for separation and return of the movable plate 51 of the mandrel 22 as required at the different operating stations in the path of the mandrel as it is carried in a circular path by rotation of the shaft 23'. A tension spring 66 is connected at 67 to the arm 58 and at 68 to the bracket plate 61 so as to hold the cam roller 62 against the cam face 63.

An air hose 70 is connected at one end to a discharge nozzle 71 and at the other end to an aperutre 72 in the hub 45 which has a connection with an air box 73 on the fixed frame 65 so as to supply a blast of air within the mandrel when the latter reaches a bag discharge station and thereby eject the bag from the mandrel. The air box 73 is connected by the hose 74 to a compressed air supply and may be adjusted to provide for rejection of the bag at any desired point. Other bag stripping devices may, of course, be employed to remove the bags from the mandrels when they are completed.

A modified form of the bag is illustrated at 80 in FIGURES 15 and 16. The bag 80 is formed from a web 81 of polyethylene film or similar plastic sheet material which is fed from a supply roll to a folding bar 82 (FIGURE 12). The folding bar 82 folds the web 81 upon itself about a horizontal fold line 83 with the marginal edge portions of the film offset as shown so that one edge 84 extends a short distance outwardly of the other edge 85. The flattened tube 86 thus formed is fed by rollers 87 and 87' to a heated knife 88 and co-operating anvil roller 88'. The tube 86 is cut and simultaneously sealed with a bead type seal 89 at longitudinally spaced intervals by operation of the knife 88 so as to divide the web into a plurality of bag forming sections 90, each of which has its side edges formed by bead seals 89 and one end closed along the fold line 83.

Each successive bag section 90 is advanced by the feed rollers 91 and 92 to the belts 93 and 94, the roller 95 being mounted on a pivoted arm 96 so as to intermittently feed the bag sections between the two pairs of belts 93 and 94. The bag sections are advanced by the belts 93 and 94 into proper position for movement in a lateral direction by a right angle transfer mechanism which comprises two pairs of co-operating segments 97, 97' and 98, 98'. The rotating segments 97, 97' and 98, 98' move the bag sections from the belts 93 and 94 to pairs of feed rollers 100 and 101 from which they are advanced to the mandrels 22 on the turret 23 by feed rollers 44 and belts 21, 21' in the same manner as shown in FIGURE 1. The mandrels 22 are expanded and the bag bottom is formed in the same manner as described in connection with the bag 10. The bottom forming portions 102 of the bag sections 90 are squared up on the mandrel 22 and the resultant triangular end portions are cross sealed by seal forming members so as to form bead seals 103 and 103' as shown in FIGURE 15 with the waste portions of the folded triangular members being cut away in the same manner as illustrated with respect to triangular members 26 and 26' in FIGURE 5.

If it is desired to collapse the bags 80 after they are removed from the mandrels 22 they may be flattened as illustrated in FIGURE 16. The body forming portion of the bag is collapsed so as to assume its original condition before expansion thereof on the mandrels 22. The side walls 104 and 104' and the end walls 105 and 105' are flattened so as to bring the bead seals 89 along the side edges of the body portion. The bottom forming portion 102 is folded about the bottom edge 106 of the one side wall 104' against the opposite side wall 104 which results in lower triangular portions of the end walls folding into the plane of the bottom portion 102 along fold lines 107, 107' and 108, 108' which extend from the end seams 103 and 103' to the ends of the edge folds.

While specific materials and details of construction are referred to in connection with the description of the illustrated forms of the bag and the method and apparatus for forming the same, it will be understood that equivalent materials and other details of construction may be resorted to within the spirit of the invention.

I claim:

1. Apparatus for forming bags from heat sealable plastic film material comprising means for folding a continuous web of the film material into a tube, means for transversely severing and sealing the tube at longitudinally spaced intervals to form a plurality of bag sections each having a closed end, means forming a turret rotatably mounted adjacent said tube severing and sealing means, a plurality of expansible mandrels mounted in spaced relation on said turret, means for feeding the bag sections to successive mandrels, means for telescoping each bag section over a mandrel which is in collapsed condition, means for expanding each successive mandrel to square up the bag section thereon with the closed end of the bag section folding into a flat plane at the free end of the mandrel and providing generally triangular end portions which project on opposite sides at the end of the mandrel, heat sealing means mounted adjacent the periphery of the turret for sealing across said triangular end portions along the end edges of the mandrel, and trimming means mounted adjacent the periphery of the turret for cutting across said triangular end portions so as to remove the waste portion thereof which extends outwardly beyond the edge seals.

2. In an apparatus as recited in claim 1 wherein each mandrel comprises a plate member fixed on the turret and a co-operating plate member mounted on a slide member, a track for said slide member, and cam controlled means for reciprocating the slide member on the track to move it toward and from the fixed plate member so as to expand and contract the mandrel.

3. In an apparatus as recited in claim 1 wherein each of said mandrels comprises a rectangular plate member fixed on the turret and a co-operating rectangular plate mounted on a slide member, a track on said mandrel for supporting said slide member for reciprocal movement, a cam operated lever arm mounted on the turret and engaging the slide member, and a fixed cam for operating said lever arm.

4. Apparatus for forming bags from heat sealable plastic film material comprising means for forming a continuous web of the film material into a tube, means for heat sealing overlapping edge portions of the web to form a longitudinal seam, means for transversely severing and sealing the tube at longitudinally spaced intervals to form a plurality of bag sections, means forming a rotatable turret support adjacent said tube severing and sealing means, a plurality of expansible mandrels mounted in spaced relation on said rotatable support, means for feeding the bag sections to successive mandrels, means for telescoping each bag section over a mandrel while the mandrel is collapsed, means for expanding each successive mandrel to square up the bag section thereon with the sealed end of the bag section folding into a flat plane at the free end of the mandrel and providing generally triangular end portions which project on opposite sides at the end of the mandrel, heat sealing means mounted in a path extending about the turret and operative for sealing across said triangular end portions along the end edges of the mandrel, and trimming means mounted adjacent said heat sealing means in said path for cutting across said triangular end portions so as to remove the waste portion thereof which extends outwardly beyond the edge seals.

5. Apparatus for forming bags from plastic film material comprising means for forming a continuous web of the film material into a tube, means for sealing side marginal portions of the film to form a longitudinal seam, means for transversely sealing the tube at points spaced longitudinally thereof so as to provide a plurality of bag sections, means for separating each bag section from the adjoining bag sections, a supporting turret mounted adjacent said separating means, a plurality of collapsible plate mandrels mounted in peripherally spaced relation on said supporting turret, means for opening the leading ends of successive bag sections and telescoping the same over the mandrels while the mandrels are collapsed, means for expanding the mandrels to square up the bag sections with the bottom forming sealed end of each bag section folding flat against the free end of the expanded mandrel and providing generally triangular bottom end portions which project on opposite sides at the end of the mandrel, means mounted adjacent the periphery of said supporting turret for sealing across the triangular end portions along the edges of the mandrel, and means mounted adjacent the periphery of said supporting turret and spaced beyond the sealing means for said end portions for cutting across said triangular end portions outside of the sealing lines.

References Cited by the Examiner
UNITED STATES PATENTS

| | | | |
|---|---|---|---|
| 2,446,798 | 8/1948 | Vergobbi | 93—59 |
| 2,577,386 | 12/1951 | Vergobbi | 93—18 |
| 2,771,010 | 11/1956 | Piazze | 93—35 |
| 3,085,478 | 4/1963 | Egli | 93—12 |

FRANK E. BAILEY, *Primary Examiner.*